(12) United States Patent
Rudolf et al.

(10) Patent No.: US 8,220,328 B2
(45) Date of Patent: Jul. 17, 2012

(54) ACCELEROMETER WITH OFFSET COMPENSATION

(75) Inventors: Felix Rudolf, Corcelles (CH); Roberto Frosio, Neuchatel (CH); Pascal Zwahlen, Auvernier (CH); Bertrand Dutoit, Baulmes (CH)

(73) Assignee: Colibrys SA, Neuchatel (CH)

( * ) Notice: Subject to any disclaimer, the term of this patent is extended or adjusted under 35 U.S.C. 154(b) by 528 days.

(21) Appl. No.: 12/397,744

(22) Filed: Mar. 4, 2009

(65) Prior Publication Data

US 2009/0223276 A1   Sep. 10, 2009

(30) Foreign Application Priority Data

Mar. 5, 2008 (EP) .................................. 08152329

(51) Int. Cl.
  *G01P 15/00* (2006.01)
(52) U.S. Cl. ..................... 73/514.01; 702/141
(58) Field of Classification Search .................. None
  See application file for complete search history.

(56) References Cited

U.S. PATENT DOCUMENTS

2004/0237626 A1 * 12/2004 Challoner et al. ............. 73/1.38
2007/0144255 A1    6/2007 Handrich et al.

FOREIGN PATENT DOCUMENTS

WO    03/010492 A1   2/2003

OTHER PUBLICATIONS

European Search Report dated Aug. 6, 2008.
Clark, W.A. et al.: "Surface Micromachined Z-Axis Vibratory Rate Gyroscope", Technical Digest, IEEE Solid-State Senor & Actuator Workshop, New York, NY, US Jun. 3, 1996, pp. 283-287, XP001028168.

\* cited by examiner

*Primary Examiner* — Hezron E Williams
*Assistant Examiner* — Nathaniel Kolb
(74) *Attorney, Agent, or Firm* — Pearne & Gordon LLP

(57) ABSTRACT

A method for evaluating and/or compensating the acceleration offset in a combined accelerometer and gyroscope, wherein the evaluation or compensation is based on a quadrature signal delivered by the accelerometer.

19 Claims, 4 Drawing Sheets

ACCELEROMETER WITH OFFSET COMPENSATION

The present application claims priority of European Patent Application EP08152329, the content of which is included herewith by reference.

The present application is further related to European Patent Application EP08152320, the content of which is included herewith by reference.

FIELD OF THE INVENTION

The present invention relates generally to an accelerometer with acceleration offset compensation. The invention notably, but not only, relates to combined acceleration and rotational sensors, such as combined gyroscopes and accelerometers. The present invention relates more specifically, but not exclusively, to micromachined, mems-based, sensing vibrating gyroscopes for measuring angular velocity and acceleration. The present invention relates more specifically to open loop and to servo (closed loop) acceleration sensors.

INTRODUCTION AND RELATED ART

Vibrating gyroscopes rely on the vibration of a proof mass in one direction and in detecting the Coriolis force generated in a perpendicular direction by the rotational speed. Vibrating gyroscopes are formed, for example, by etching a semiconductor to form a proof mass suspended by a spring system, such as elastic beams, to the substrate. An electronic drive circuit which may be on the same substrate applies an alternating drive current to driving electrodes which vibrate the proof mass in a drive direction. The sensor further comprises sensing electrodes for detecting displacements of the proof mass in a sensing direction orthogonal to the drive direction. Those displacements may be caused by a Coriolis force when an angular velocity is applied to the gyroscope, and used for measuring this velocity. Displacements along the sense axis may also be caused by linear accelerations applied to the sensor along this axis, and measured with the same sensing electrodes for determining the acceleration. Vibrating gyroscopes may thus be combined with an accelerometer.

The production process and the technology used for producing the springs and the beams in mems (micro electrical mechanical systems) -based gyroscopes often lead to quadrature errors (or quadrature bias), i.e. errors caused by driving the vibrating proof mass along a direction which is not exactly perpendicular to the direction along which the Coriolis movement is measured. The component of the vibrating drive movement in the sense direction generates an output signal (the quadrature signal) superposed to the signal caused by the Coriolis force and by the acceleration.

The Coriolis and quadrature effects generate high frequency signals with a main frequency corresponding to the frequency of the drive signal. On the other hand, the acceleration usually generate a constant signal or a signal at a much lower frequency, so that band filters may be used to isolate the component of the output signal caused by acceleration only.

The quadrature signal and the signal caused by the Coriolis force have identical or close frequencies, but they are phase-shifted. In fact, the quadrature output signal is in phase with the drive signal used for driving the proof mass, while the component of this output signal due to the Coriolis force is delayed. Electronic demodulation circuits are thus known in the art for separating those two components. Additional electrodes or electronic filtering circuits have also been suggested for reducing the quadrature signal. However, accurate separation may be difficult when the amplitude of the quadrature signal is large as compared with the Coriolis sense signal.

In the present document, a quadrature force designates any force along the sense axis in phase with the drive signal oscillation, in particular but not exclusively any force along the sense axis caused by displacements of the proof mass in a direction different from the drive axis. A quadrature signal designates a component or part of the output signal caused by those quadrature forces. Quadrature signals designate in particular detrimental signals which are superposed to the output sense signal that are caused by unwanted displacements of the proof mass along the sense axis when the proof mass is vibrated. Open loop accelerometer designates a sensor where a proof mass is displaced under the influence of acceleration, Coriolis and quadrature forces, whereas Coriolis and quadrature signals are derived from the mass displacement related to these forces. A servo accelerometer designates a sensor where acceleration, Coriolis and/or quadrature forces are compensated by servo forces, for example electrostatic forces that maintain the proof mass at a certain position $Z_0$. Thus, in a servo accelerometer (or closed loop accelerometer), the position of the proof mass is evaluated and used as a feedback signal in a loop for compensating any displacement.

The output signal is not only related to acceleration, Coriolis and quadrature forces, but is also affected by offset errors related to the force measurement system including the plate position measurement system using fixed capacitor plates and the capacitance evaluation circuit. In this application, the offset signal (or simply offset) is defined as the output signal in the absence of any forces such as acceleration, Coriolis or quadrature forces.

Different factors may affect this offset. For example, packaging stress can deform the sensor and change the position of the fixed capacitor plates with respect to the attachment of the springs. Offset may also be induced by the measurement and/or servo electronics, for example changes in stray capacitors or changes in the offset of the electronics, especially but not only when the electronic controls the position of the proof mass along the sense axis. One of the sources of offset change at low frequency is the 1/f noise of electronic amplifiers. Temperature, shocks, aging and hygrometry may also affect the offset. In a servo sensor, the position $Z_0$ is also affected by offsets in the position detector system and the associated electronics, leading to a further offset contribution.

During manufacturing or calibration offset effects can be measured and corrected. However, during operation, a change in the offset of the accelerometer cannot be easily distinguished from a change in the position of the proof mass caused by the acceleration. The offset causes a constant or low frequency bias to the output signal similar to the constant or low frequency signal induced by the acceleration. The unknown offset thus has a negative impact on the precision with which acceleration can be measured.

It is thus an aim of the invention to distinguish displacements of the proof mass which are caused by the acceleration from displacements due to the offset.

US-A1-2007/144255 discloses a gyroscope with quadrature-bias compensation. As mentioned, quadrature-bias is an error caused by driving the vibrating proof mass along a direction which is not exactly perpendicular to the direction along which the Coriolis movement is measured; this quadrature-bias is only produced when the sensing mass is oscillated. The quadrature bias and the offset signals are two different signals; this document only solves the problem of quadrature, but not the problems caused by offset.

Clark W. et al., <<Surface micromachined z-axis vibratory rate gyroscope>>, Technical Digest, IEEE Solid-State Sensor & Actuator Workshop, New York, USA, Jun. 3, 1996 discloses another gyroscope in which a DC signal is applied in order to compensate the quadrature error. This document does not mention the problem of offset, and does not suggest any solution for evaluating or compensating the offset.

WO-A-03/010492 describes a further method for reducing the quadrature signal, without addressing the problems caused by the offset.

BRIEF SUMMARY OF THE INVENTION

The invention relies among other on the finding that in open loop accelerometers having a mass vibrating perpendicular to the sense direction (in the same way as in vibrating gyroscopes), the acceleration signal as well as the quadrature signal both depend on the input acceleration.

However, for servo accelerometers the acceleration signal obviously depends on the acceleration or rotational rate, the quadrature signal is independent of the acceleration along the sense axis and of the rotation rate. Therefore, any change in the quadrature signal that is not related to the driving is due to parameters of the sensor, essentially changes in the reference position $Z_0$ of the proof mass caused by the offset.

The invention also relates to the finding that at least in some servo accelerometers, a change in the position of a proof mass along a sense axis caused by the offset induces a change in the quadrature force, due to a change in the coupling between the drive mode and the sense mode of the proof mass.

According to another aspect of the invention, it has been found that in many gyroscopes, the acceleration signal delivered by the sensing electrodes has a good or at least acceptable signal-to-noise ratio, but is very sensitive to the problem of offset. It is therefore another aim of the invention to develop a device and method to get independent information about the acceleration which is less sensitive to offset.

In one aspect, the invention thus relates to an accelerometer and to a method where changes in the quadrature signal are determined and used for evaluating or compensating the offset.

More generally, the invention relates to an acceleration offset compensation circuit where the compensation depends on a quadrature signal or force.

The invention also relates to a method for evaluating the acceleration in an accelerometer, comprising:

measuring a sense signal delivered by the accelerometer, said sense signal depending on the position of a proof mass along a sense axis, said sense signal comprising a first component depending on the acceleration and a second component depending on the offset, determining a quadrature signal of the accelerometer;

based on said quadrature signal, evaluating and/or compensating said second component depending on the offset.

The method uses the quadrature signal (which may be determined by a servo quadrature compensation circuit) for evaluating the offset, and/or for removing the component dependent on offset from the output signal delivered by the accelerometer.

The invention applies in particular to a device having a spring suspension with essentially 3 degrees of freedom, one along a sense axis, one along a drive axis and one around a rotation axis, not passing through the center of gravity, where the sense direction, the drive direction and the rotation axis are essentially mutually perpendicular.

The invention is not limited to any specific method for determining the quadrature signal. In an embodiment, the quadrature force is determined from the output signal, using high-pass frequency filter for separating quadrature signal from the acceleration signal, and phase demodulation circuits for separating the quadrature signal from a Coriolis signal.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
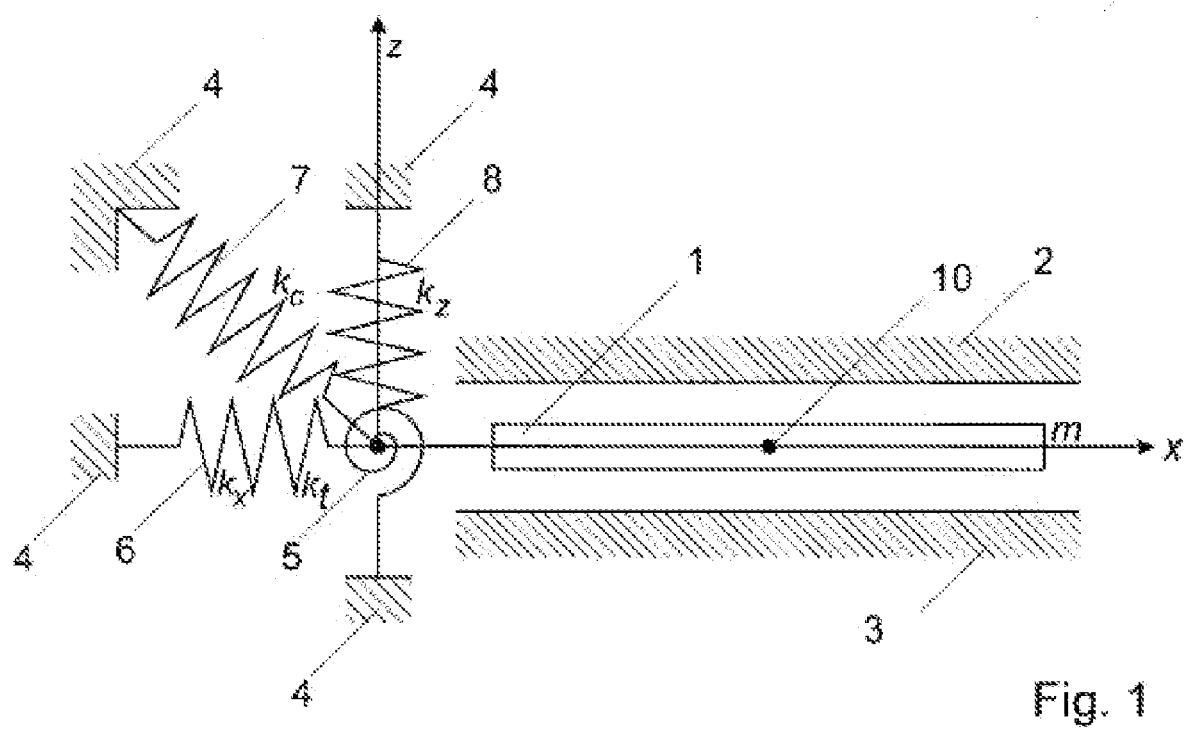
FIG. 1 is a schematic view of the general structure of a vibrating gyroscope.

FIG. 1 schematically illustrates a model of an example of vibrating accelerometer and/or gyroscope, which may be realized for instance but not necessarily using mems-technology. The illustrated accelerometer and/or gyroscope generally comprises a proof mass 1 which is suspended by the springs 5, 6, 7, 8 in such a way that the proof mass has essentially three degrees of freedom relative to the substrate 4; the other degrees of freedom are either undetectable or otherwise irrelevant. The spring suspension system is schematically represented here by four equivalent springs, namely a first longitudinal spring 6 with a constant $k_x$ along the x axis, a second coupling spring 7 with a constant $k_c$ corresponding to quadrature forces in the z direction due to a deflection in the x direction, a third longitudinal spring 8 with a constant $k_z$ along the z axis, and a fourth spring 5 with a constant $k_r$ acting on rotations in a x-z plane, around an axis close to the spring attachment point. In this document, the x axis will also be called the drive axis and the z axis the sense axis. Vibrations of the proof mass along the drive axis x are induced by an electrical drive mechanism (not shown).

In a preferred embodiment, the proof mass 1 in the form of a plate is suspended by the spring suspension system in such a way that the plate has essentially three degrees of freedom: translation along the x axis, a translation along the z axis and rotation in the x-z plane. The spring suspension system is arranged such that the remaining three degrees of freedom can be neglected.

In an embodiment, the spring suspension system has a resonant frequency such that the frequency of the oscillations along the sense axis z is substantially lower than the drive frequency applied for vibrating the proof mass along the axis x. There is thus no need to adjust precisely the resonant frequency of the mechanical system.

The accelerometer and gyroscope schematically illustrated on FIG. 1 further comprises an upper sensing electrode 2 and a lower sensing electrode 3. The electrodes 2, 3 build together with the proof mass 1 is a capacitive system with two capacitors whose values depend on the distance between each sensing electrode and the proof mass. The position of the proof mass along the sense axis z can be measured by an electronic circuit 21 (FIG. 5) by evaluating both capacitances between the two sensing electrodes 2, 3 and the proof mass. The output circuit may thus deliver output sense signals $F_{cor}$, $F_a$, $F_q$ that depend on the displacement of the proof mass along the sense axis z and that may be changed by Coriolis forces, accelerations along the z-axis and quadrature forces respectively.

In a first embodiment, the sensor is an open loop sensor. In this case, the electronic circuit 21 evaluates the output signals by measuring the displacement of the proof mass due to the forces acting on the proof mass.

In another embodiment, the sensor is a servo sensor. In this case, the electronic circuit 21 applies electrostatic forces to the proof mass as to maintain the proof mass 1 at a certain position $Z_0$. The output signals are then evaluated based on the applied electrostatic forces. The electrostatic forces may be applied by using Sigma Delta servo techniques.

The electrodes 2, 3, and/or other electrodes not shown, may also be available for driving the proof mass along the drive axis x and, optionally, for controlling its position along the sense axis z.

The electronic circuit 21 that processes the output signal delivered by the accelerometer may comprise analog and/or digital filters for separating low frequency component of the output signal from higher frequency components of the output signal. Low frequency components are induced mainly by the offset and by the linear acceleration along the sense axis z. Higher frequency components are induced mainly by Coriolis forces along the sense axis z and by quadrature forces. The part of the output signal generated by the Coriolis force is phase shifted in relation with the quadrature induced output signal, so that both parts can be distinguished using appropriate analog and/or digital phase demodulation technique.

Figure 2:
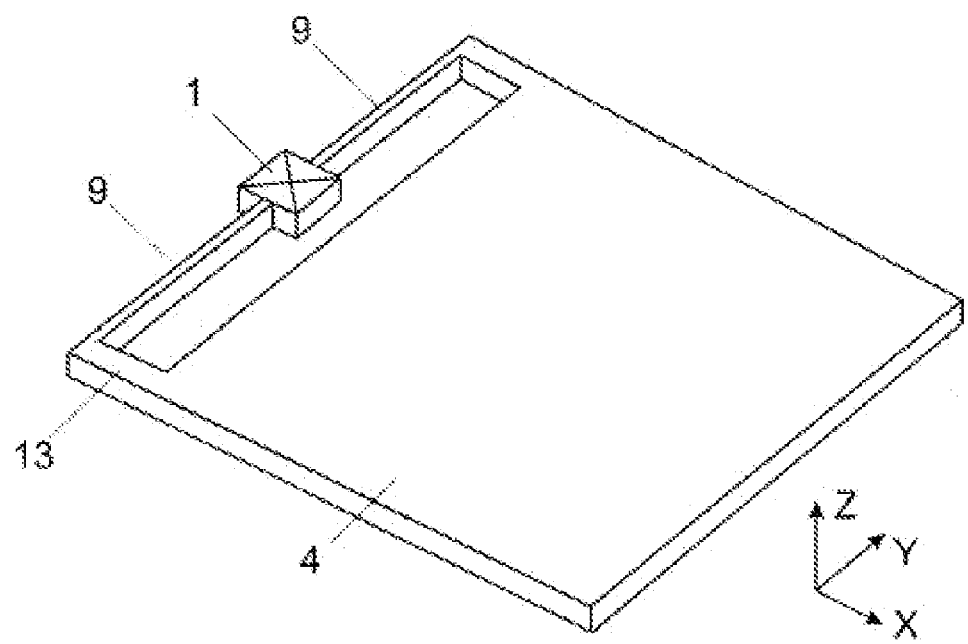
FIG. 2 illustrates a possible embodiment of a proof mass in the form of a plate suspended by straight beams to a substrate.

FIG. 2 illustrates a possible embodiment of the proof mass and spring suspension system. One side of the proof mass 1 in the form of a plate is connected by rigid beams 13 to straight beams 9 acting as springs. The other end of the beams is attached to the substrate 4. Additional springs and/or other types of springs, including folded beams, may be used for suspending the proof mass to the substrate 4.

In drive mode, the springs 9 are bent and the proof mass is moved along the drive axis x. This drive mode is used to excite the vibration of the proof mass 1 and give rise to Coriolis forces that are used to measure rotation rates.

Displacements of the proof mass along the sense axis z result from Coriolis forces causing torsion of the spring system 9 around an axis parallel to y and close to the attachment point of the spring system to the substrate. Quadrature forces also rotate the proof mass along a different axis parallel to y but crossing the plate. The position of the proof mass in the sense direction z further depends on offset caused by imperfections in the geometry and in the electronic, as already described.

In one aspect, the invention relies on the fact that for servo sensors, the quadrature force is independent of the acceleration and of the rotation rate. Therefore, any change in the quadrature signal for a fixed drive force $F_x$ is due to parameters of the sensor, essentially due to an offset caused by a change of the servo reference point $Z_0$ of the proof mass 1. In one aspect, the invention thus uses changes $\Delta F_q$ of the quadrature signal $F_q$ to determine and/or compensate the associated acceleration offset force $F_{os}$.

In another aspect, the invention relies on the fact that for open loop sensors, acceleration influences both the acceleration signal and the quadrature signal. The acceleration information derived from the acceleration signal tends to have good noise characteristics where the acceleration signal derived from the quadrature signal has good offset stability since the quadrature signal is not affected by offset. It is thus possible to improve the estimation of the acceleration by using both the acceleration signal and the quadrature signal, or (in some embodiments or situations) only the quadrature signal.

Figure 3:
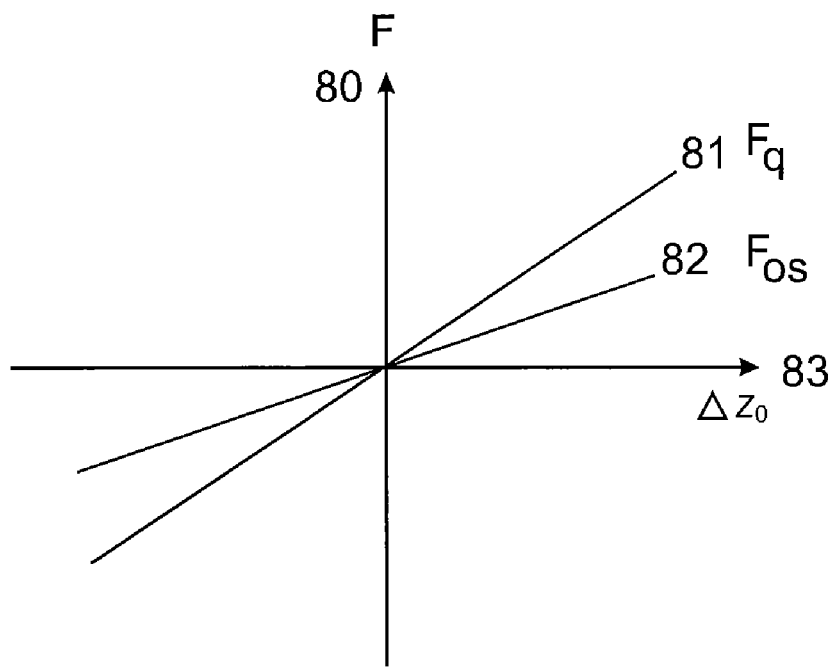
FIG. 3 is a diagram illustrating the relation between the offset $\Delta Z_0$ and the quadrature force respectively the acceleration offset force.

FIG. 3 illustrates the forces in a servo sensor. The forces 80 acting on the proof mass 1 along the sense axis z are a function of the reference position $Z_0$ (83) of the proof mass 1. Changing the reference position $Z_0$ by a value $\Delta Z_0$ causes a change in the acceleration force that appears as a constant force $F_{os}$ (82), i.e. a constant acceleration offset whose value depends only on the geometry and on $Z_0$. This force is due to the spring deformation associated with the reference position shift. For the arrangement illustrated in FIG. 1, the constant offset force $\Delta F_{os}$ 82 is given by:

$$\Delta F_{os} = \frac{\Delta Z_0}{\frac{b_0^2}{k_t} + \frac{1}{k_z}} \qquad \text{(Equation 1)}$$

where $\Delta Z_0$ is the change of the servo reference position, $k_t$ and $k_z$ are the respective spring constants, and $b_0$ is the distance between the spring attachment point and the center of gravity of the proof mass. Similar but different equations may be used for similar different arrangements.

Changing the reference position $Z_0$ by a value $\Delta Z_0$ also induces a change in the quadrature force $F_q$ (81) due to the change of the coupling between the drive mode and the sense mode. For the arrangement illustrated in FIG. 1, this change $\Delta F_q$ is given by:

$$\Delta F_q = \Delta Z_0 \frac{F_x}{b_0} \qquad \text{(Equation 2)}$$

where the drive force $F_x$ is the spring force along the axis x associated with the movement of the mass in the drive mode. The variation $\Delta F_q$ of the quadrature force appears as a change of the component of the sensor output caused by the quadrature. Similar but different equations may be used for similar different arrangements.

For a given drive force $F_x$, a change in the reference position of the proof mass $\Delta Z_0$ can thus be determined by measuring a variation $\Delta F_q$ of the quadrature signal. For a given geometry, the acceleration offset $\Delta F_{os}$ induced by $\Delta Z_0$ can then be determined or compensated by using Equation 1, or a corresponding equation depending on the geometry.

Figure 4:
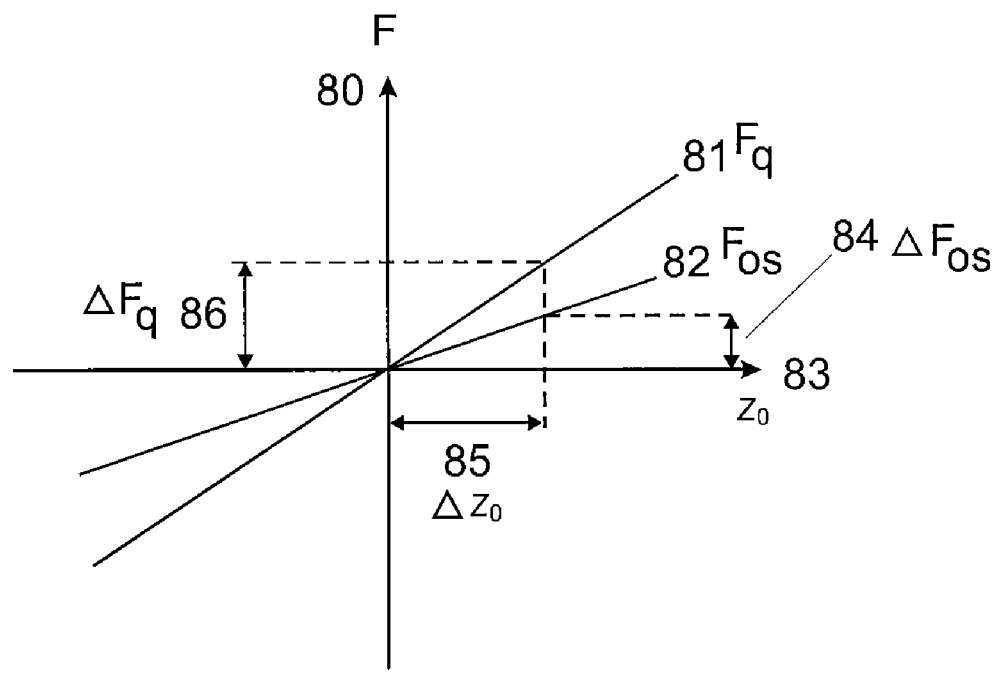
FIG. 4 is a diagram illustrating the calibration method.

In an embodiment illustrated on FIG. 4, a change of the quadrature signal $\Delta F_q$ (86) for a given drive force $F_x$ is measured. The corresponding offset of the position of the proof mass $\Delta Z_0$ can then be retrieved by an acceleration offset compensation circuit, based on a determination of a quadrature signal using Equation 1 or, equivalently, the calibration curve 81. Knowing $\Delta Z_0$ and the calibration curve 82 or the Equation 2, the circuit can then retrieve the acceleration offset $\Delta F_{os}$, and possibly compensate (for example cancel) this offset.

The calibration curves 81, 82 for a particular accelerometer can either be calculated for a specific design, or measured during a calibration step. This calculation or determination may be performed during manufacturing of the sensor, and/or periodically repeated, for example upon turn-on of the accelerometer. Correction and/or compensation are then based on previously determined curves.

The offset compensation or correction is easier if the accelerometer is motionless; in this case, the acceleration and rotation rate are null or at least known, so that the output signal delivered by the sensor only depends on the quadrature force which can be retrieved easily. However, a calibration is also possible during operation, with previously undetermined acceleration and rotation rate; in this case, the quadrature signal $F_q$ can be retrieved using an appropriate band filter and phase-demodulator.

Continuous compensation or correction of the offset is also possible where the quadrature signal $F_q$ is continuously or periodically measured and used for compensating any offset.

Figure 5:
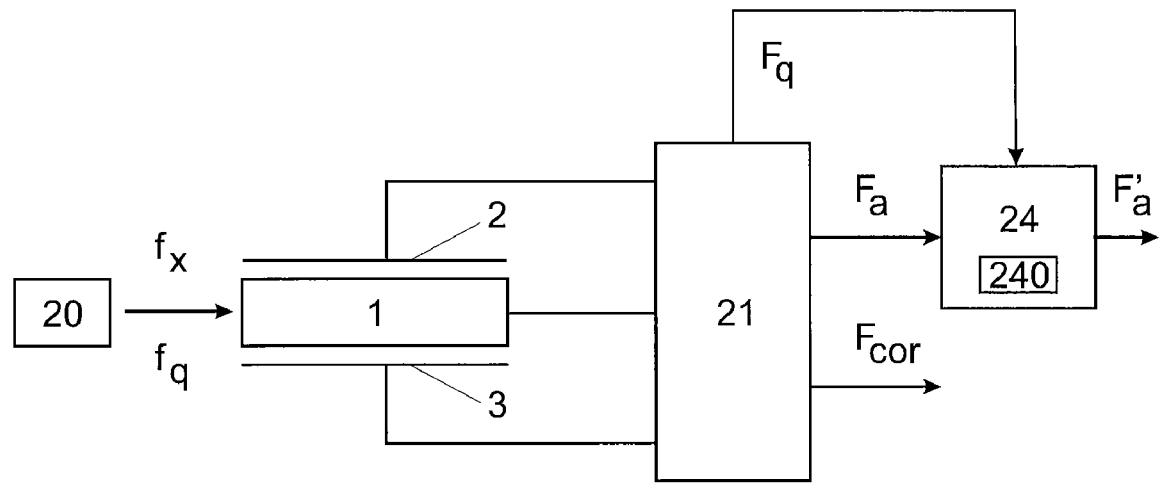
FIG. 5 is a block schematic of an accelerometer according to an embodiment of the invention illustrating an offset correction by correcting the output signal according to a predefined calibration curve.

FIG. 5 is a block schematic illustrating a possible embodiment of an accelerometer and gyroscope. The Figure shows a drive mechanism 20 applying a drive force $f_x$ to a proof mass 1 in order to vibrate is in a drive direction. Manufacturing imprecisions induces a quadrature force $f_q$ in phase with the drive force but in sense direction z orthogonal to the drive direction x. The system further comprises an electronic circuit 21 including a servo system applying electrostatic forces to maintain the proof mass 1 at a certain reference position $Z_0$. The circuit 21 further includes filters and phase-demodulators (not shown) for determining an acceleration signal $F_a$ and a rotational rate signal $F_{cor}$ based on the output signal at sense electrodes 2, 3. Acceleration can be retrieved from the acceleration signal $F_a$ and rotational rate from the $F_{cor}$ signal.

The electronic circuit 21 further delivers a quadrature signal $F_q$ depending on the quadrature force induced on the proof mass.

The calibration curves 81, 82 for a particular accelerometer are preferably stored in an electronic memory 240, and used by the electronic offset compensation circuit 24 for compensating or determining the acceleration offset. The offset compensation circuit 24 thus delivers an acceleration signal $F'_a$ independent from offset, or less-dependent from offset than $F_a$.

Figure 6:
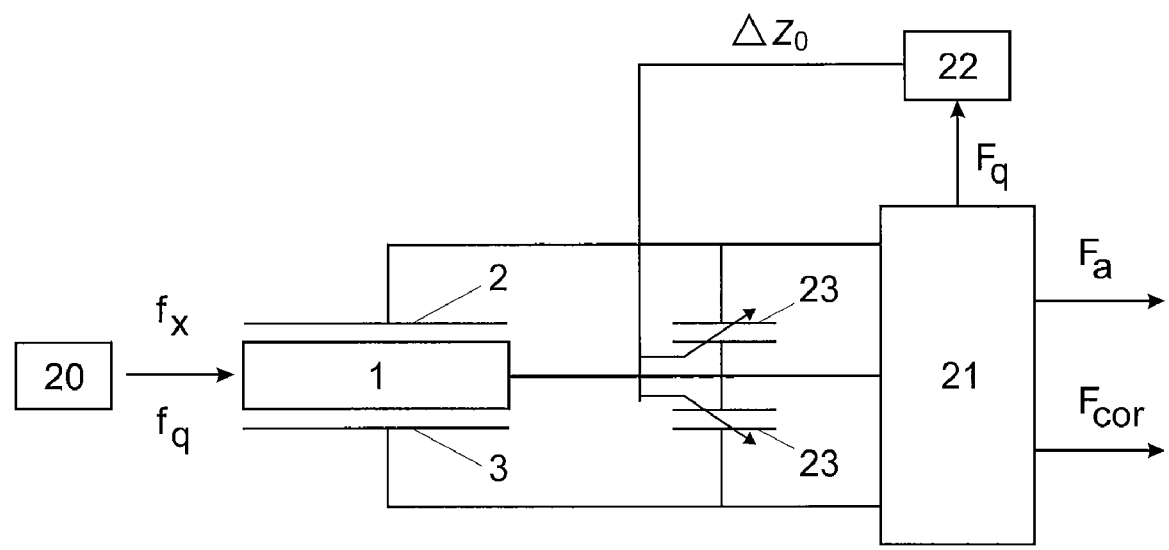
FIG. 6 is a block schematic of an accelerometer according to an embodiment of the invention, illustrating an offset correction scheme based on the adjustment of the reference position $Z_0$.

In the embodiment of FIG. 6, a drive mechanism 20 applies a drive force $F_x$ to a proof mass 1 in order to vibrate it in a drive direction. Manufacturing imprecisions induce a quadrature force $f_q$ in phase with the drive force but in sense direction z orthogonal to the drive direction x.

The sensor comprises an electronic circuit 21 including a servo system applying electrostatic forces to maintain the proof mass at a certain reference position $Z_0$, filters and phase-demodulators (not shown) for determining an acceleration signal $F_a$ and a rotational rate signal $F_{cor}$ based on the output signal at sense electrodes 2, 3. Acceleration can be retrieved from the acceleration signal $F_a$ and rotational rate from the $F_{cor}$ signal.

The electronic circuit 21 further delivers a quadrature signal $F_q$ depending on the quadrature force induced on the proof mass. This quadrature signal $F_q$ is used in a feed-back loop of the acceleration offset compensation circuit 21, 22. The feedback circuit 22 in the feedback loop uses a signal based on the quadrature signal $F_q$ for adjusting the position $Z_0$ of the proof mass 1 in such a way that the quadrature signal $F_q$ is maintained at a constant level—preferably at a known level, such as preferably at zero. The proof mass is thus maintained at a certain servo reference position $Z_0$, irrespective of any offset changes in the position of the fixed capacitor plates or changes in the electronics circuit, and the accelerometer offset $\Delta Z_0$ stays at a constant level. In a preferred embodiment, the servo reference position $Z_0$ of the proof mass is adjusted by electrostatic forces applied with the electrodes 2, 3. Additional adjustable capacitors 23, for example capacitors in parallel to the sensor capacitors 2, 3, may be used to change the capacitive signal supplied to the electronics in order to correct the different offsets and thus maintain the reference position $Z_0$.constant. The adjustment may be done digitally, by using a bank of capacitors and switching a suitable combination of capacitors depending on the measured quadrature signal, so as to maintain this quadrature signal constant. Adjustment of the position $Z_0$ with continuously adjustable capacitors, such as varistors, or with other means, may also be considered. Other means to correct the capacitive signal may be used.

The invention also relates to the combination of two or more than two systems as described above, for example several systems operating at the same frequency but in anti phase mode in a tuning fork configuration. Different aspects of the invention can be used alone or combined together. The method and system may be applied to simple accelerometers, multi-axis accelerometers, and/or accelerometers combined with gyroscopes.

Figure 7:
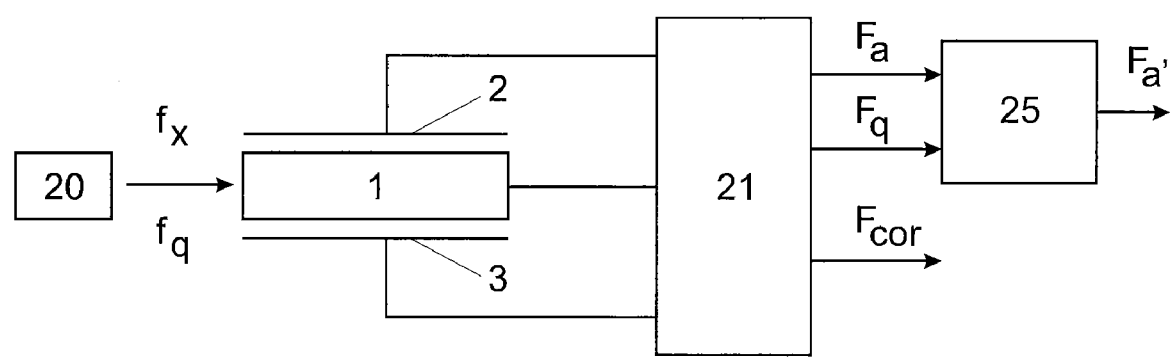
FIG. 7 is a block schematic of an accelerometer according to an embodiment of the invention illustrating an open loop sensor where the acceleration and the quadrature signals are both used to evaluate the acceleration.

FIG. 7 is a bloc schematics that illustrates a possible embodiment of an open loop sensor. The electronic circuit 21 delivers output signals $F_a$, $F_q$ and $F_{cor}$ based on the displacement of the proof mass 1, as determined with the electrodes 2,3. In an open loop sensor the dependency of the quadrature force on acceleration can be described by:

$$f_q = \frac{f_x}{b_0} \cdot \left[\frac{b_0^2}{k_t} + \frac{1}{k_z}\right] \cdot m \cdot a$$

In this embodiment, an acceleration output evaluation circuit 25 delivers an acceleration signal based on the (uncorrected) acceleration signal delivered by the circuit 21 and on the quadrature signal Fq. It is also possible within the frame of the invention to base the computation of the acceleration Fa' on the quadrature signal $F_q$ output by the electronic 21 only.

$F_q$ is the quadrature force related to acceleration, m is the proof mass and a is an external acceleration. The other symbols designate the same quantities as in equations 1 and 2. Thus the quadrature signal $F_q$ as well as the acceleration signal $F_a$ are proportional to acceleration. The acceleration signal tends to be very accurate and low noise at higher frequency but is subject to offset, while the acceleration information derived from the quadrature signal based on the relation indicated in equation 3 is much less affected by offset but has a higher noise level. Both signals are combined in a filter 25 to extract an optimized acceleration signal. The filter can be of the Kalman type.

The method and accelerometer of the invention can also be used in accelerometers and/or gyroscopes having quadrature force compensation or cancellation means, including gyroscopes being arranged so that quadrature forces generate displacements of the proof mass without substantially displacing the neutral point, or gravity center, of the proof mass along the sense axis. Although the quadrature component in the signal output by the electrodes 2, 3 is null or neglectable, it may still be possible to determine the quadrature forces (possibly using additional electrodes for sensing any tilt or other displacements of the proof mass caused by the quadrature forces) and to compensate or evaluate the offset.

The acceleration output evaluation circuit 25 may comprise hardware and/or software components, and may include a sensor-specific table with values determined at manufacturing and/or during calibration, and/or during operation.

LIST OF REFERENCE NUMBERS

1 Proof mass
10 Center of gravity of the proof mass
13 Rigid beam
2 Upper electrode
3 Lower electrode
4 Fixed substrate
5 Rotational Spring
6 x axis spring
7 y axis spring
8 z axis spring
9 Spring (beam)
20 Drive mechanism
21 Electronic circuit
22 Feed-back circuit
23 Variable capacitor or bank of capacitors
24 Offset correction circuit
240 Memory
25 Acceleration output evaluation circuit
80 Forces along z on the proof mass
81 Quadrature force $F_q$
82 Acceleration offset force $F_{os}$
83 Position $Z_0$ of the proof mass along the sense axis z
84 Variation $\Delta F_{os}$ of the acceleration offset force $F_{os}$ induced by $\Delta Z_0$
85 Variation $\Delta Z_0$ of the position of the proof mass along z
86 Variation $\Delta F_q$ of the quadrature force $F_q$ induced by $\Delta Z_0$

The invention claimed is:

1. A method for evaluating the acceleration in an accelerometer, comprising:
   measuring a signal depending on the position of a proof mass along a sense axis, said signal comprising at least a first component depending on the acceleration and a second component depending on the offset;
   determining a quadrature signal of the accelerometer; and
   based on said quadrature signal and on a calibration curve previously stored in a memory, evaluating, compensating, or both evaluating and compensating said second component depending on the offset.

2. The method of claim 1, comprising a step of vibrating a proof mass in a drive direction and obtaining one or several sense signals depending on displacements of the proof mass in a sense direction orthogonal to the drive direction.

3. The method of claim 2, comprising filtering to separate components of the sense signal due to quadrature, Coriolis, or both quadrature and Coriolis effects from said first and second components due to the acceleration and offset.

4. The method of claim 1, wherein the quadrature signal is determined during a calibration step.

5. The method of claim 4, wherein the quadrature signal is determined upon turn-on of the accelerometer.

6. The method of claim 1, wherein the quadrature signal is determined continuously or periodically.

7. The method of claim 1, comprising:
   based on said quadrature signal, determining a position of the proof mass along the sense axis; and
   based on said position, evaluating or compensating said second component dependent on the offset.

8. The method of claim 1, wherein the quadrature signal is further used in a feedback control loop for adjusting the position of the proof mass along the sense direction.

9. The method of claim 8, wherein a variable capacitor or bank of capacitors is switched for modifying electrostatic forces acting on the proof mass depending on said quadrature signal.

10. The method of claim 1, comprising determination of an angular rate based on Coriolis forces acting on the proof mass.

11. An accelerometer comprising:
   a proof mass;
   a memory storing a calibration curve;
   electrodes;
   a capacitance system comprising said electrodes and at least a part of the proof mass,
   wherein at least one capacitance depends on the position of the proof mass along a sense axis; and
   an offset determination or compensation circuit that uses a quadrature signal and said calibration curve to determine an acceleration offset.

12. The accelerometer of claim 11, the acceleration offset compensation circuit comprising a variable capacitor or bank of capacitors, wherein the value of the variable capacitor changes electrostatic forces applied to the proof mass.

13. The accelerometer of claim 11, the acceleration offset compensation circuit comprising a servo loop circuit for controlling the position of the proof mass along the sense axis.

14. The accelerometer of claim 13, the servo loop circuit using a feedback signal based on the quadrature signal.

15. The accelerometer of claim 11, comprising a circuit for correcting the acceleration based on a quadrature signal.

16. The accelerometer of claim 11, further comprising:
   a spring suspension system for suspending the proof mass;
   an electrical drive mechanism for vibrating the proof mass along a drive axis;
   an electronic circuit for determining a rotational rate based on capacitance changes due to a Coriolis effect.

17. The accelerometer of claim 16, comprising a filter to separate components of a signal due to Coriolis and quadrature effects from components of the signal due to the acceleration and offset.

18. The accelerometer of claim 11, wherein the spring suspension system has a resonant frequency such that the frequency of the oscillations along the sense axis is substantially lower than the frequency of oscillations along the drive axis.

19. The accelerometer of claim 11, comprising a circuit for adjusting electrostatic forces permanently applied to the proof mass (1) in order to reduce quadrature signals ($F_q$).

* * * * *